Oct. 19, 1954     R. P. CLAYTON     2,691,843
SAFETY FLY HOLDER
Filed May 29, 1953
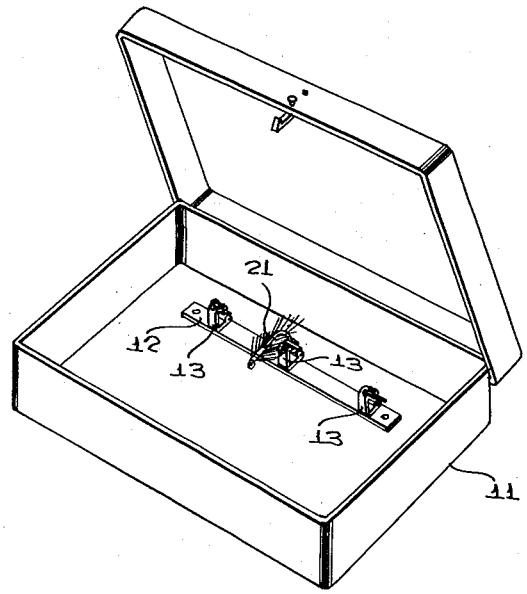
Fig. 1
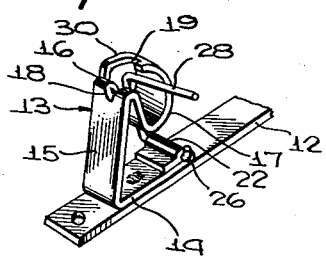
Fig. 2
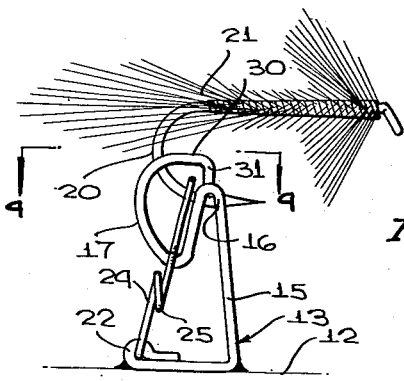
Fig. 3
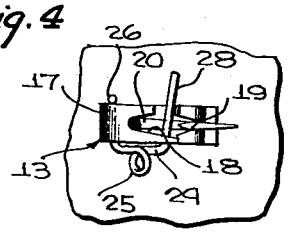
Fig. 4
Fig. 6
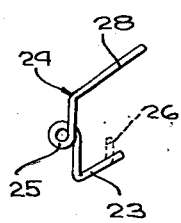
Fig. 5
INVENTOR.
Robert P. Clayton
BY
McMorrow, Berman & Davidson
ATTORNEYS Patented Oct. 19, 1954

2,691,843

UNITED STATES PATENT OFFICE 2,691,843

SAFETY FLY HOLDER

Robert P. Clayton, Montpelier, Idaho

Application May 29, 1953, Serial No. 358,273

2 Claims. (Cl. 43—57.5)

This invention relates to fishermen's equipment, and more particularly to an improved holder for fish lures, trout flies, and the like.

A main object of the invention is to provide a novel and improved fish lure holder which is simple in construction, which is arranged to separately and securely hold a fishing fly or lure for the purpose of transportation or storage thereof, and which is arranged to hold a fishing lure or fly in a fully visible position.

A further object of the invention is to provide an improved holder for fishing lures, trout flies, and the like, said holder being inexpensive to manufacture, being durable in construction, being compact in size, being arranged to accommodate a wide range of different sizes of hooks, and being suitable for supporting wet lures or flies in a favorable position for drying.

Further objects and advantages of the invention will become apparent from the following description and claims, and from the accompanying drawings, wherein:

Figure 1 is a perspective view of a fishing lure box provided with improved lure holding means constructed in accordance with the present invention.

Figure 2 is a fragmentary perspective view of the supporting strip, showing one of the improved lure holding means secured thereon, as employed in Figure 1.

Figure 3 is a side elevational view of the lure holding element shown in Figure 2.

Figure 4 is a top view of the lure holding element, taken on the line 4—4 of Figure 3 and showing a portion of a lure supported on the holding element in horizontal cross section.

Figure 5 is a perspective view of the resilient locking member employed in the lure holding element of Figures 1 to 4.

Figure 6 is a perspective view of an alternative form of resilient locking member which may be employed in the lure holding element disclosed in Figures 1 to 4.

Referring to the drawings, 11 designates a box which may be employed for containing fishing lures according to the present invention, said box being of conventional construction. Secured to the bottom of the box in the interior thereof is a longitudinally extending strip member 12 of any suitable rigid material, and secured on the strip member 12 in longitudinally spaced positions thereon are a plurality of lure holding elements designated generally at 13.

The strip members 12 may be arranged longitudinally in the box 11, as shown in Figure 1, in which case the lure holding elements 13 may be arranged transverse to the strip members 12, or alternatively, the strip members 12 may be arranged transversely in the box 11, whereby the lure holding members may be arranged longitudinally on said strip members, as shown in Figure 2.

As shown in Figure 2, each lure holding element 13 comprises a base member 14 which is rigidly secured in any suitable manner, as by welding or the like, to the supporting strip 12. Integrally formed with the base member 14 is the rigid upstanding arm 15 formed at its top with a reverse bend 16 to define an offset portion 17 overlying the base member 14. Said offset portion 17 comprises a generally U-shaped loop located adjacent the main body of the arm 15, the reverse bend 16 being formed with a first notch 18 and the end of the loop 17 being formed with a second notch 19 opposing the notch 18 and being in alignment therewith.

As will be apparent from Figures 3 and 4, the notches 18 and 19 are arranged to receive the bight of the hook 20 of a fishing lure 21.

The end of the base portion 14 opposite the arm 15 is formed with an integral sleeve portion 22 in which is secured the bottom arm 23 of a spring member 24, said spring member being formed from a piece of spring wire and being provided with the intermediate spring loop 25. As shown in Figure 5, the end of the bottom arm 23 of the spring member 24 may be bent upwardly, as illustrated in dotted view at 26 to lock arm 23 in the supporting sleeve 22. The top portion of the spring member 24 is formed with an arm 28 extending parallel to the bottom arm 23 and received through the loop member 17 between the notches 18 and 19. As shown in Figures 3 and 4, the top arm 28 of the spring member 24 is adapted to overlie and clampingly engage the bight 20 of the hook of the lure to secure said bight portion in the notched seats 18 and 19. The end of the loop member 17 at one side of notch 19 is formed with a finger element 30 extending over the arm 28 and being bent downwardly at 31 to substantially engage the bend 16, as shown in Figure 3. The finger 30 serves as a positive stop element to limit upward deflection of the arm 28 to prevent the spring member 24 from becoming excessively distorted and to serve as a stop means aiding in the seating of the bight portion 20 of the lure hook in the notches 18 and 19.

In using the device, the lure is mounted on the supporting element 13 by engaging the bight portion of the hook under the spring arm 28 and then slipping the hook laterally so that the bight portion 20 of the hook snaps into seating position in the notches 18 and 19, the spring arm 28 being slightly elevated to allow said bight portion to be engaged in said notches. In this position, the bight portion 20 of the hook cannot be moved further in a lateral direction beyond the notches 18 and 19 since the finger 30 serves as a positive stop means limiting further lateral movement of the hook. As shown in Figures 3 and 4, the spring arm 28 overlies the lower element of the bight 20 of the hook and exerts a clamping force which serves to support the bight portion 20 in the position illustrated, with the main portion of the lure or fly above the supporting element 13 in a fully visible and exposed position. To remove the lure or fly 21, it is merely necessary to lift same slightly and then move the lure or fly laterally outwardly to disengage the bight portion 20 thereof from the notches 18 and 19.

Referring now to Figure 6, an alternative form of spring member is shown at 24', said spring member 24' being generally similar to the spring member 24 except that instead of employing the spring coil 25 at the intermediate portion of the spring member, as shown in Figure 5, the member 24' employs a resilient U-bend 39 at its intermediate portion, said U-bend serving the same purpose as the coil element 25 in Figure 5. As shown in Figure 6, the spring element 24' has a base arm 23' which is secured in the sleeve 22 in the same manner described in connection with the base element 23 of the spring member 24, and the spring element 24' also has the top arm 28' which performs the same function as the top arm 28 in the previously described form of the invention.

It will be readily apparent that the lure holder above described provides a means of holding a fly securely and individually, whereby the fly is protected against damage, and is at the same time readily visible so that a desired fly may be easily selected by the user. The holder is adapted to receive and support any one of a wide range of different sizes of hooks, since the bight portion of the hook is seated in the notches 18 and 19 and the spring arm 28, or 28', clampingly engages said bight portion, regardless of the curvature of the bight portion.

While certain specific embodiments of an improved holder for fish lures has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A holder for fish lures comprising a base member, a rigid upstanding arm secured to said base member, said arm being formed at its top with a reverse bend to define an offset portion, said offset portion being bent to define a generally U-shaped loop adjacent the main body of the arm, the reverse bend and the end of said loop being formed with opposed notches to receive the bight of the hook of a lure, a resilient locking member secured to said base member and extending through said loop to lockingly engage over the bight portion of a hook seated in said notches, and a keeper finger on the end of said loop extending over said resilient locking member.

2. A holder for fish lures comprising a base member, a rigid upstanding arm secured to said base member, said arm being formed at its top with a reverse bend to define an offset portion, said offset portion being bent to define a generally U-shaped loop adjacent the main body of the arm, the reverse bend and the end of said loop being formed with opposing notches to receive the bight of the hook of a lure, a spring wire having one end secured to said base member and having its other end extending through said loop between said notches, to lockingly engage over the bight portion of a hook seated in said notches, and a keeper finger on the end of said loop extending over said resilient locking member at one side of the notches to substantially engage said reverse bend, said finger transversely overlying said other end of the spring wire.

References Cited in the file of this patent

UNITED STATES PATENTS

| Number | Name | Date |
|---|---|---|
| 2,007,224 | Stoekle | July 9, 1935 |
| 2,649,191 | McLaughlin | Aug. 18, 1953 |